United States Patent

Buttin et al.

[11] Patent Number: 5,876,764
[45] Date of Patent: Mar. 2, 1999

[54] AUTOMATIC COTTON CANDY MACHINE

[76] Inventors: Paul Buttin, 310 Montee du Chemin-Neuf, 01120 Montluel; Jean-Marc LeCulier, Chanes, 01360 Beligneux, both of France

[21] Appl. No.: 875,973
[22] PCT Filed: Feb. 8, 1996
[86] PCT No.: PCT/FR96/00212
  § 371 Date: Sep. 8, 1997
  § 102(e) Date: Sep. 8, 1997
[87] PCT Pub. No.: WO96/24257
  PCT Pub. Date: Aug. 15, 1996

[30] Foreign Application Priority Data

Feb. 10, 1995 [FR] France ................................... 95 01741

[51] Int. Cl.$^6$ .................................................. B29C 47/00
[52] U.S. Cl. ............................... 425/9; 425/145; 221/186
[58] Field of Search ..................... 221/174, 186, 221/189, 187; 425/9, 145

[56] References Cited

U.S. PATENT DOCUMENTS

| | | | |
|---|---|---|---|
| 3,042,183 | 7/1962 | Ackley | 221/174 |
| 3,135,225 | 6/1964 | Winkler et al. | 221/186 |
| 3,203,365 | 8/1965 | Bowe et al. | |
| 3,580,456 | 5/1971 | Zueger | |
| 3,747,738 | 7/1973 | Greck | 221/174 |
| 3,841,531 | 10/1974 | Merila | 221/189 |
| 4,293,292 | 10/1981 | Israel | |
| 4,316,553 | 2/1982 | Persson | 221/186 |
| 5,427,811 | 6/1995 | Fuisz et al. | |
| 5,516,272 | 5/1996 | Cummins | 425/145 |

FOREIGN PATENT DOCUMENTS

| | | |
|---|---|---|
| A 0591095 | 4/1994 | European Pat. Off. |
| A 2173677 | 10/1973 | France |
| A 2248792 | 5/1975 | France |
| 189666 | 1/1967 | U.S.S.R. ................................. 221/174 |

*Primary Examiner*—Jay H. Woo
*Assistant Examiner*—Robert Hopkins
*Attorney, Agent, or Firm*—Oliff & Berridge, PLC

[57] ABSTRACT

A machine includes a stick hopper for dispensing sticks one by one and a device for transferring each stick to a chuck between whose jaws the stick is held while protruding into a basin containing a sugar sprayhead. The chuck is driven rotationally, as is the sprayhead, during a cotton candy forming operation. The hopper containing sticks includes a cylinder with a horizontal or substantially horizontal axis. The cylinder is mounted to pivot about its axis and is associated with a motor. The cylinder is further equipped on its internal face with at least one lengthwise bar delimiting a cavity that matches the shapes of the sticks, the cavity being provided in the face of the bar that faces forward in the direction of rotation of the cylinder. The cylinder contains, below its uppermost generatrix, a device for collecting each stick picked up by the bar in the hopper and releasing the latter under the effect of gravity.

10 Claims, 4 Drawing Sheets

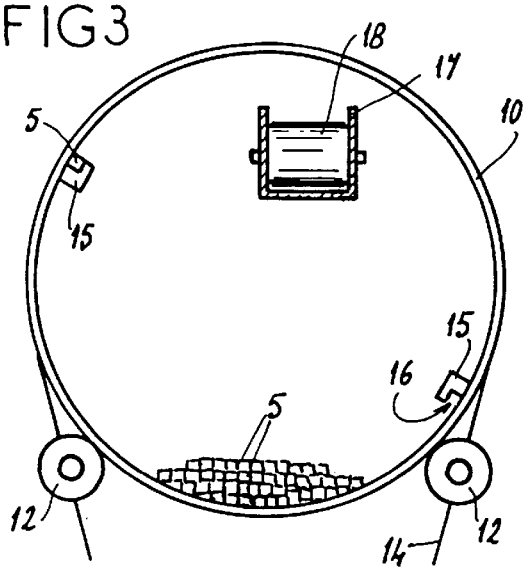
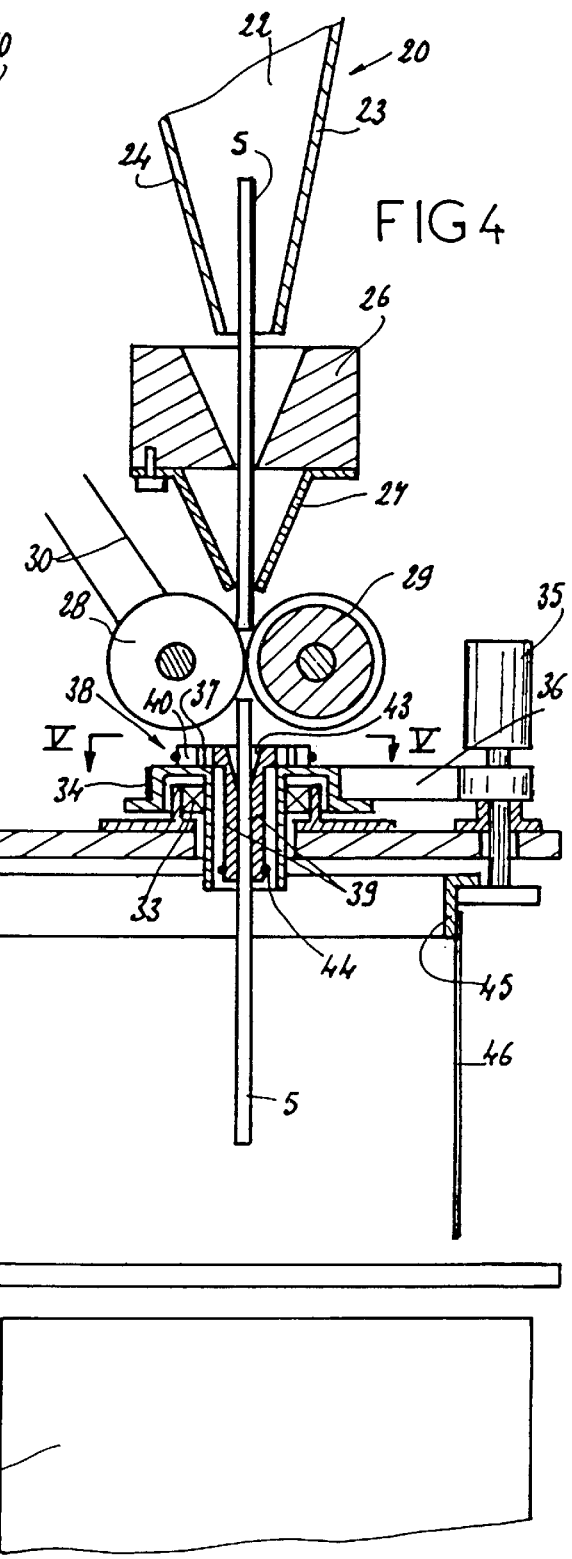
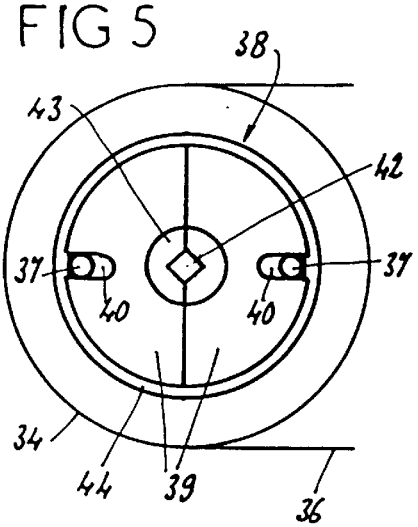

FIG6
FIG7
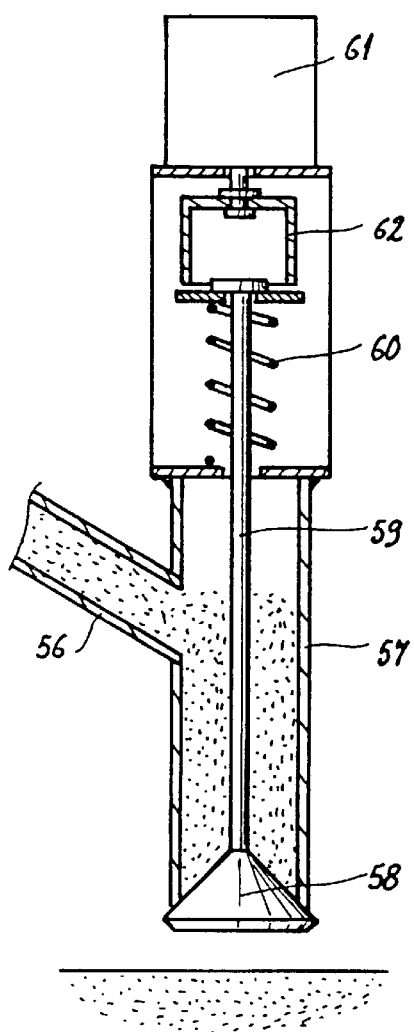
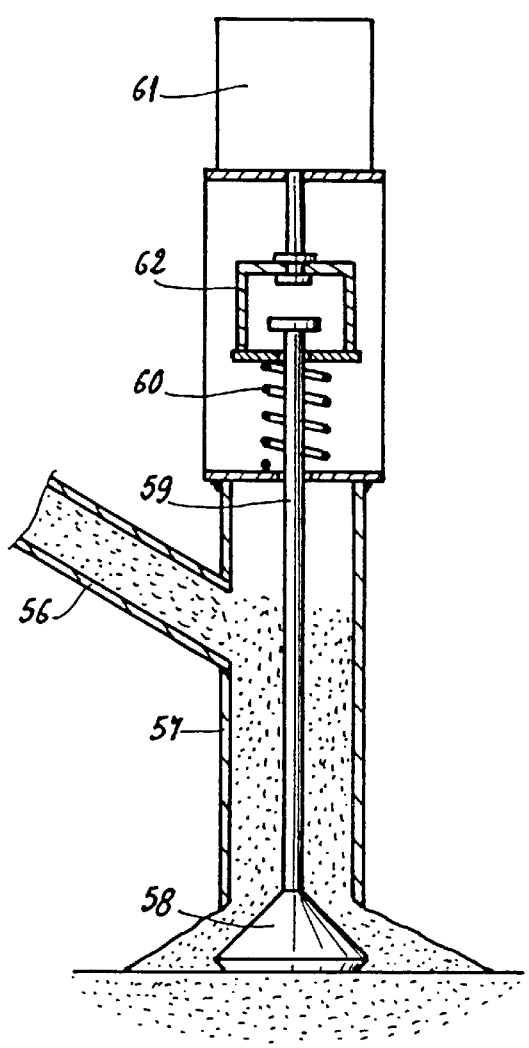

AUTOMATIC COTTON CANDY MACHINE

BACKGROUND OF THE INVENTION

1. Field of the Invention

The present invention relates to an automatic cotton candy machine. Cotton candy is a confection made of sugar filaments wound onto a stick.

2. Description of the Related Art

Traditionally, cotton candy is made with continuous involvement of an operator. A cotton candy machine has a hollow cylindrical head filled with sugar, heated to approximately 150° C., and revolving at high speed, between 3000 and 5000 rpm. The head has radial orifices and the melted sugar is centrifuged in the form of filaments. Dispersion of these filaments in the outward direction is limited by a basin-shaped receptacle. The operator, provided with a stick or cardboard cone, collects the filaments of centrifuged sugar and forms them into a ball with a diameter of approximately 30 cm. He executes two kinds of manual movement: he twirls the stick around its own axis and swipes the stick along the basin wall.

The attempt has already been made to make automatic cotton candy machines. Such a machine is described in Document FR 2,248,792.

However, such machines could never be operated satisfactorily and independently because the stick supply hopper allowed storage of only a limited number of sticks, because stick pickup was unsatisfactory as the sticks had to be perfectly calibrated, which is not the case in practice, leading to breakage of certain sticks that were off-center relative to the stick holder, and finally because the discharge device for the formed cotton candy could not be implemented for both technical and hygienic reasons.

SUMMARY OF THE INVENTION

The goal of the invention is to furnish a machine for automatic production of cotton candy that can operate independently by means of a coin meter, a card device, a simple button, or any other mechanism triggering the production process without requiring the continuous or intermittent presence of an operator, its design taking into account the irregular shapes of the sticks, and requiring periodic loading, at very long intervals, of both the sticks and the soft sugar.

For this purpose, the machine to which it relates, of the type having a stick hopper for dispensing the sticks one by one, a device for transferring each stick to a chuck between whose jaws the stick is held while protruding into a basin containing the sugar sprayhead, the chuck being driven rotationally, as is the sprayhead, during the cotton candy forming operation, is characterized in that the stick hopper is comprised of a cylinder with a horizontal or substantially horizontal axis, said cylinder being mounted to pivot about its axis and being associated with a rotational drive means, said cylinder further being equipped on its internal face with at least one lengthwise bar delimiting a cavity that matches the shapes of the sticks, said cavity being provided in the face of the bar that faces forward in the direction of rotation of the cylinder, said cylinder containing, below its uppermost generatrix, a device for collecting each stick picked up by the bar in the hopper and escaping the latter under the effect of gravity.

Since the sticks intended for forming the cotton candy are usually made of wood, square in cross section, 4 mm on a side, they have a cross section that is not perfectly consistent, and are not always straight, with ends that are sometimes chipped. Moreover, these characteristics may vary according to atmospheric moisture and storage conditions. The device according to the invention allows a large number of sticks to be loaded into the cylinder. The sticks are gripped individually with a rod delimiting a specific cavity, and the nonmatching sticks, for example a stick that is not straight, will not be picked up by the rod and not transferred to the cotton candy forming station. Aside from the fact that this device allows the sticks to be processed simply with shape monitoring, it stores a large number of them with no need for the operator to position them precisely, as one need only load in the sticks in bulk, oriented substantially lengthwise in the cylinder, and the sticks will then be positioned and gripped automatically by a rod. It is advantageous to provide two gripping rods offset 180° apart on the inside face of the cylinder.

According to one possibility, the cylinder is supplied by rollers that allow it to be driven rotationally by a toothed belt driven by a motor and abutting the periphery of the cylinder.

According to another characteristic of the invention, the device for collecting and transferring each stick picked up in the hopper comprises a substantially horizontal trough disposed in the cylinder, one end of said trough extending beyond the latter, said trough also containing an endless motorized belt whose end outside the cylinder terminates in a device for changing the position of each stick from horizontal to vertical.

At the downstream end of the endless belt, the machine includes a device for changing the position of each stick from horizontal to vertical, said device being comprised of a hopper delimited by two substantially vertical walls oriented in the stick-feed direction, a wall opposite the stick-feed direction, slightly inclined to the vertical, and a wall located near the stick infeed having successively, from top to bottom, a substantially horizontal plane, a plane inclined at approximately 45°, and a plane slightly inclined relative to the vertical.

At the output of the hopper, the stick is in the vertical position. Here, the machine includes means for centering each stick in the vertical position, said means consisting of at least one funnel and means for inserting each stick into a chuck, comprised of two rollers with parallel axes, at least one of which is grooved and at least one is motorized.

According to another characteristic of the invention, the chuck has a pulley pivotably mounted on a fixed support and driven rotationally at its periphery, said pulley being equipped, on the side opposite the support, with two pins oriented parallel to its axis, each pin being engaged in a recess in a jaw of which the chuck is comprised, the two jaws delimiting a central opening for holding a stick, and being kept pressed against each other by at least one elastic element such as an O-ring surrounding said chuck.

It should be noted that the two jaws of the chuck are freely mounted so that the central opening that they delimit aligns with the stick as positioned by the two drive rollers disposed just above the chuck. The two jaws are kept pressed against each other and a stick is inserted between them by force with the two jaws being spread apart as this stick is moved by the rotation of the two rollers.

A stick is axially positioned for forming cotton candy as soon as it escapes the two drive rollers.

A stick on which the cotton candy has been formed is discharged by axial displacement of the next rod moved up by the two drive rollers.

When the stick on which the cotton candy has been formed escapes the chuck, it falls by gravity to a receiving area.

According to another characteristic of the invention, the basin containing the sugar sprayhead, inside which cotton candy is formed onto a stick, is comprised of a crown driven rotationally on which a lateral wall is movably mounted, and is delimited by an upper panel traversed by the chuck that holds a stick when the cotton candy is formed.

It is interesting to note that the side wall of the basin, attached to the crown, for example by a double-sided adhesive or snap fasteners, and which is for example made of a disposable material such as cardboard, can be changed periodically, which is an advantage from the hygiene standpoint, since sugar is being splashed onto this surface as each serving of cotton candy is formed.

In order to favor hygiene and allow the consumer to pick up the cotton candy just formed from a consistently clean surface, this machine has, below the panel of the basin, a cotton-candy receiving area accessible through a door or the like, and includes two rollers with horizontal, parallel axes, one of which has a roll of synthetic food-quality film winding onto the other roller which is the takeup roller, driven sequentially, with the area between the rollers forming the receiving area for the cotton candy before it is discharged.

At the beginning or at the end of each cotton-candy-forming cycle, the two rolls of synthetic film are wound off so that the film in the cotton candy-receiving area is replenished.

In addition, this machine has a sugar storage bin whose lower end has an opening that communicates through a valve with a slanting tube that itself communicates with a vertical tube which, terminating above the sugar sprayhead to supply the latter with sugar, is equipped at its lower end with a plug in the shape of a poppet valve, integral with a rod passing axially through the tube, the other end of said rod being urged by a spring acting in the valve closing direction, a solenoid being provided which, when energized, drives a plunger which compresses the spring and releases the rod and plug.

In addition, this machine has, in its front face, an opening for access to the cotton-candy receiving area, closable by a door comprised of a cylindrical-surface section with a horizontal axis, whose two ends are integral with two end panels shaped like circular disks with the same axis as the cylindrical surface section, which are articulated on the two lateral walls of the machine around this axis, such that, in a first position, the cylindrical-surface section, located outside the machine, blocks the opening and, in a second position, the cylindrical-surface section is tipped inside the machine, uncovers the opening, and allows access to the cotton-candy receiving area.

This machine also has an automatic mechanism or chip which, from the coin meter or other control device, triggers the succession of the various sequences allowing cotton candy to be made automatically.

BRIEF DESCRIPTION OF THE DRAWINGS

In any event, the invention will be well understood with the aid of the description hereinbelow with reference to the schematic drawings attached showing, as a nonlimiting example, one embodiment of this machine:

FIG. 3 is a detailed view of the stick storage and dispensing device;

FIG. 4 is a partial detailed view of the stick positioning and holding device when cotton candy is formed;

FIG. 5 is a cross-sectional view of the stick-holding chuck along line V—V in FIG. 4;

FIGS. 6 and 7 are two detailed views on an enlarged scale of the sugar feed device.

DETAILED DESCRIPTION OF PREFERRED EMBODIMENTS

Figure 1:
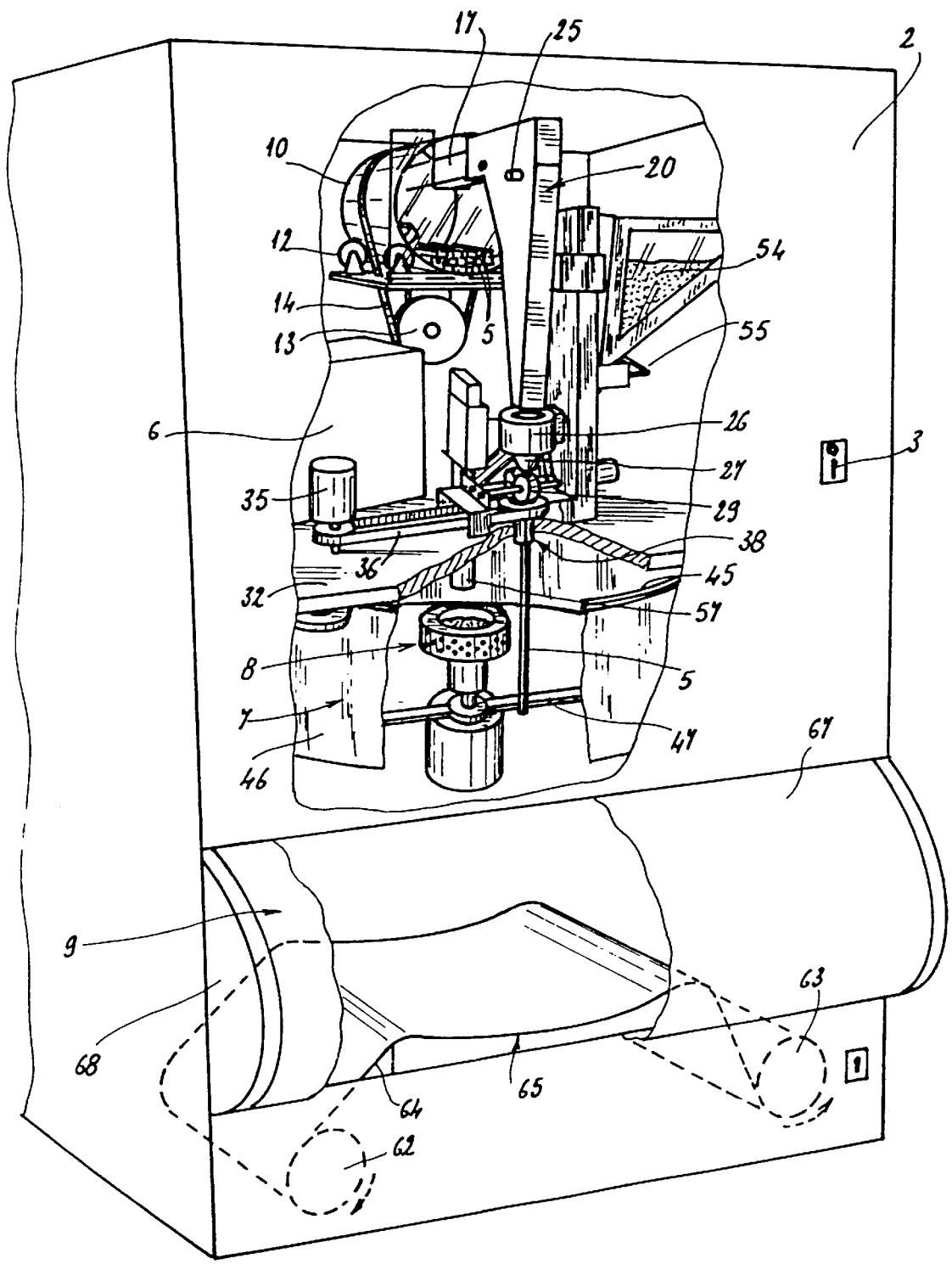
FIG. 1 is a perspective view of the machine whose front face is partially cut away.

The machine shown in FIG. 1 has a housing 2 in the front face of which are provided a coin meter slot 3 and an opening 4 for access to the finished cotton-candy receiving area, closed by a flap not shown in the drawing.

Inside housing 2, this machine may be considered to be subdivided into three superimposed compartments, of which the upper compartment holds sticks 5 and the sugar intended for forming the cotton candy, elements for transferring these sticks and the sugar, and an automatic control system 6; the intermediate compartment has the cotton-candy forming elements, particularly a basin 7 and a sugar sprayhead 8, and the lower compartment has a receiving area 9 for the formed cotton candy.

The upper compartment first contains a cylinder 10 with a horizontal axis, mounted to pivot around its axis on support rollers 12. Cylinder 10 is driven rotationally by a motor 13 to whose output shaft a pulley is keyed, said pulley driving a belt 14 passing over a portion of the periphery of cylinder 10. This cylinder 10, which is greater in length than sticks 5, is designed to contain these sticks disposed lengthwise on the inside, to a depth that can be substantially equal to the radius of the cylinder. Two lengthwise bars 15 are attached to the inside wall of cylinder 10, said bars being offset 180° from each other and each delimiting a cavity 16 that matches the shape of sticks 5, said cavity being provided in the face of the bar that faces the direction of rotation of the cylinder. Below its uppermost generatrix, the cylinder contains a trough 17 open at the top and extending beyond one of the ends of the cylinder. This trough contains an endless belt 18 tensioned by a nut 19. The downstream end of the endless belt terminates in a hopper 20. Hopper 20 is delimited by two parallel vertical walls 22 oriented in the feed direction of the sticks as well as two walls 23 and 24 disposed opposite the stick infeed and near the stick infeed. Wall 23, opposite to the stick infeed, is slightly inclined to the vertical, while wall 24 has successively, from top to bottom a substantially horizontal plane, a plane inclined at approximately 45°, and a plane slightly inclined relative to the vertical. The lengths of each of these planes are less than the length of one stick. In practice, a stick fed by endless belt 18 tilts slightly before coming in contact with wall 23, at that point breaking the beam of a photoelectric cell 25 or activating a detection device such as a microswitch, then abuts the inclined plane of wall 24 before assuming a vertical position at the hopper output. Just below the hopper are two funnels 26 and 27, aligned vertically, each having an opening whose diameter is slightly greater than the largest transverse dimension of the sticks. Two rollers with horizontal axes, made of polyurethane or sheathed with polyurethane or a similar material are disposed beneath these funnels: one smooth roller 28 driven rotationally and one grooved roller 29 mounted freely on its axis. It should be noted that roller 28 is connected kinematically by a belt 30 to endless belt 18, the same motor being used to drive roller 28 and belt 18.

The upper compartment is separated from the intermediate compartment by a panel 32. On this panel is mounted, with interposition of a bearing 33, a pulley 34 that can be driven rotationally from a motor 35 by a belt 36. On the upper face of this pulley are two upright pins 37. The inside of the pulley is used to mount a chuck 38 that has an upper annular flange allowing it to rest on the upper face of the pulley. Chuck 38 comprises two jaws 39 that, in their upper parts resting against the pulley, have two elongate recesses 40 allowing engagement of the two pins 37. It can be seen from FIG. 5 that pins 37 allow driving the chuck comprised of the two jaws 39 rotationally, while allowing the two jaws to move apart for insertion of a stick 5. Indeed, the two jaws delimit a central opening 42 for engagement of a stick 5, said opening having, at its upper part, a conical inlet 43. The two jaws, whose contours are circular, are pressed against each other by two elastic elements comprised of O-rings 44.

In the intermediate compartment is a crown 45 that can be driven rotationally from motor 35. On this crown, a deformable wall 46, made of cardboard for example, and designed to form the side wall of the basin, can be mounted for example by a double-sided adhesive.

In the center of the basin a sugar sprayhead 8 is attached by arms 47 and driven rotationally by a motor 49. Head 8 constitutes a circular vessel open at the top and perforated laterally by a number of radial holes. This head contains a resistor 50 ensuring that a temperature of 35° C. to 45° C. approximately is maintained when the machine is not in use.

Figure 2:
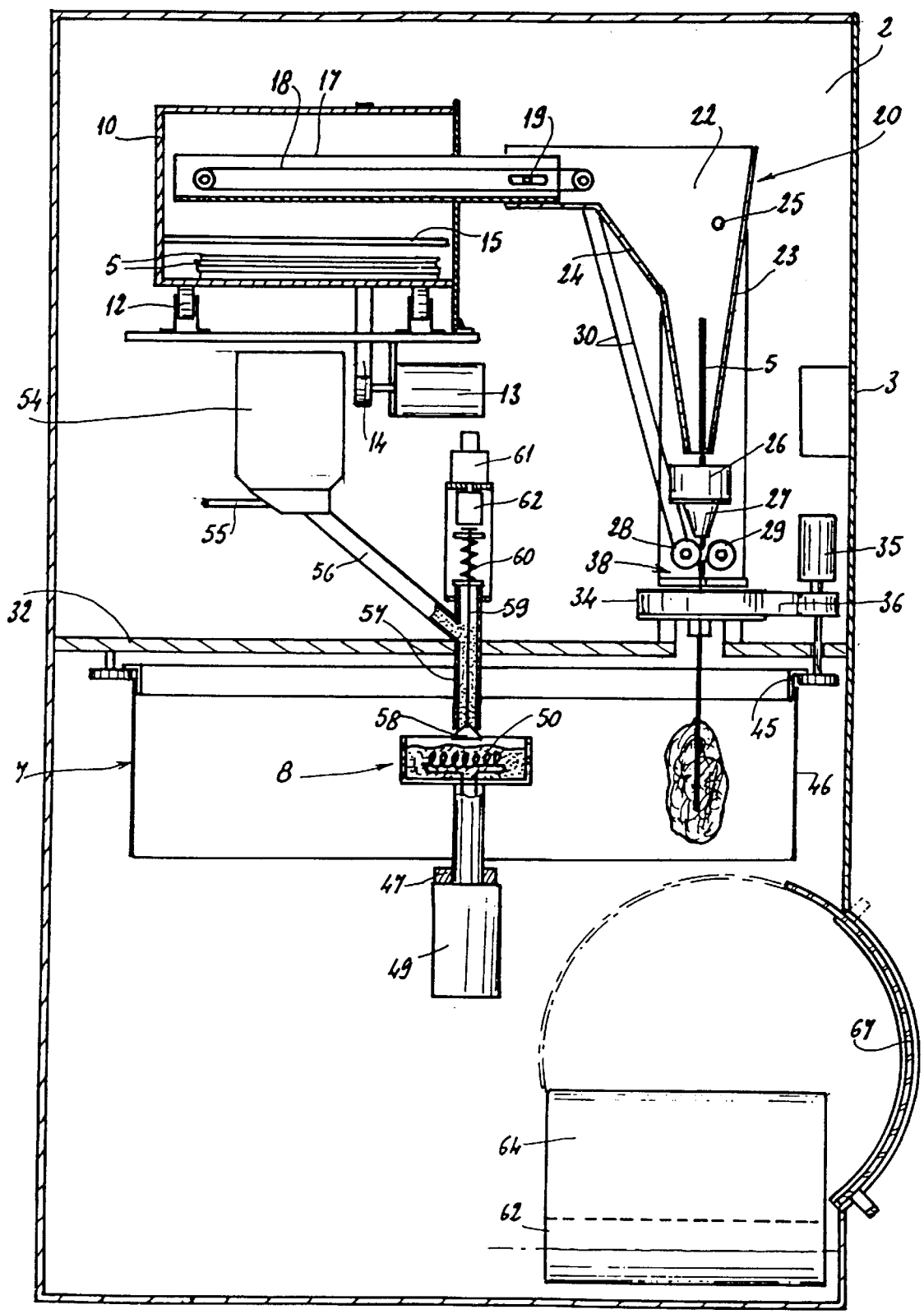
FIG. 2 is a view in lengthwise section.

As shown in particular in FIG. 2, the upper compartment also has a sugar storage bin. The lower end of this bin has a opening that provides communication through a gate valve 55 with a slanting tube 56. The lower end of this slanting tube 56 communicates with a vertical tube 57 terminating above sugar sprayhead 8 to supply the latter with sugar. The lower end of vertical tube 57 is equipped with a poppet-valve-shaped plug 58 integral with a rod 59 passing axially through tube 57, the other end of said rod being urged by a spring 60 acting in the valve closing direction. Above tube 57 is disposed a solenoid 61 whose core is integral with a plunger 62 in the shape of a socket able to act on the spring in the spring-compression direction without acting on rod 59.

As shown in particular in FIGS. 6 and 7, when the solenoid is not activated; spring 60 acts on rod 59 displacing it upward and applies poppet-valve-shaped plug 58 against the lower edge of tube 57 which is thus closed. Spring 60 also ensures upward displacement of part 62 that forms a plunger. At one point in the production cycle of a serving of cotton candy, the solenoid is energized, pushes the core, and part 62 associated therewith, as shown in FIG. 7, exerting a compression action on spring 60, and releasing rod 59 which falls by gravity, as well as valve 58 until the latter rests on the surface of the sugar. Sugar can then flow until the space between the lower edge of the tube and the upper face of the sugar is filled, as shown in FIG. 7. When the solenoid is de-energized, the assembly returns to the position of FIG. 6 under the expanding action of spring 60. This ensures that head 8 is supplied in accordance with the level of sugar therein.

Below basin 7 is disposed a cotton-candy receiving area accessible by a door, comprising two rollers 62, 63 with parallel, horizontal axes. Roller 62 has a roll of food quality synthetic film which is wound onto roller 63, which is the takeup roller, driven sequentially, and area 65 between rollers 62 and 63 forms the receiving area for the cotton candy before it is discharged.

As shown in particular in FIGS. 1 and 2, the machine has, in its front face, an opening 9 for access to the cotton-candy receiving area, closable by a door comprised of a section 67 with a cylindrical surface and horizontal axis, whose two ends are integral with two end panels 68 shaped like circular disks with the same axis as the cylindrical-surface section 67. The two end panels are articulated on the two side walls of the machine around their axes. In a first position, shown in solid lines in FIG. 2, cylindrical-surface section 67, located outside the machine, blocks opening 9. In a second position, shown in dot-dashed lines in FIG. 2, the cylindrical-surface section is tipped inside the machine by rotating about its axis, and uncovers opening 9 allowing access to the cotton-candy receiving area, while preventing access to the other elements located inside the machine.

One of the operating modes of this machine is the following.

A stick 5 is immobilized in chuck 38, in the position shown in FIG. 4, a second stick being disposed immediately above it, abutting rollers 28 and 29. When the cycle is triggered by insertion of a coin into the meter, sugar sprayhead 8 is brought to sugar-spraying temperature, and the head is rotated, as is basin 7 and chuck 38. Sugar filaments are sprayed by the head and these filaments become wound around stick 5. When the cotton candy has been formed, the rotational movements of the head, the basin, and the chuck are stopped and the automatic mechanism causes roller 28 to rotate, belt 18 to move, and solenoid 61 to be energized. The stick located above rollers 28 and 29 is then carried by them until it abuts the upper end of stick 5 around which the cotton candy has just been formed, expelling said stick 5 from chuck 38 and taking its place inside the chuck. Stick 5 with the cotton candy is discharged to receiving area 65 onto film 64.

At the same time as roller 28 is driven rotationally, belt 18 is moved and cylinder 10 is rotated. During this movement, a stick is picked up from cylinder 10, fed to belt 18, and dropped into the hopper. When cell 25 detects passage of a stick, it triggers the automatic mechanism shut off the motor driving cylinder 10 and to shut off the motor driving roller 28 and belt 18. The stick picked up in cylinder 10 is thus oriented vertically because of funnels 26 and 27 and stops, abutting rollers 28, 29.

The operating cycle also includes a phase in which roller 63 is driven rotationally to renew the sections of film 64 after each serving of cotton candy has dropped.

Finally, the cycle involves release of the bolt closing door 67, 68 allowing it to open as indicated hereinabove.

As can be seen from the foregoing, the invention provides a great improvement on the prior art by supplying an automatic cotton candy machine which, in view of its reliability and the large stores of sticks and sugar, can operate entirely independently. Reliability results in particular from the stick pickup method, as only correctly-sized sticks are used for forming the cotton candy,and by the self-centering of the chuck relative to the centering cone, which averts the risks of sticks breaking as they pass from the hopper into the chuck.

It goes without saying that the invention is not confined to the single embodiment of this machine described above as an example, but on the contrary covers all variants. Thus, in particular, the guiding and rotational driving of cylinder 10 could be different, the sticks could be transferred from the cylinder directly by gravity to the hopper without using a belt, or vertical guidance of the sticks could be accomplished by a cone or by other elements.

We claim:

1. An automatic cotton candy making machine, comprising:

a frame;

a stick hopper attached to the frame, the stick hopper dispensing sticks one by one;

a basin attached to the frame;

a chuck rotatably attached to the frame, the chuck comprising jaws for holding a stick in a first position in which the stick protrudes into the basin;

a stick transfer device attached to the frame and for transferring the stick from the stick hopper to the chuck; and a sugar sprayhead located in the basin, wherein the stick hopper comprises a cylinder with an internal face, the cylinder having a substantially horizontal axis and rotating about the axis, at least one lengthwise bar on the internal face of the cylinder and delimiting a cavity which faces in the direction of rotation of the cylinder, and a stick collecting device located below the upper most generatrix of the cylinder for collecting the stick picked up by the bar and releasing the bar under the effect of gravity as the cylinder rotates.

2. The machine according to claim 1, wherein the cylinder is supported by rollers that allow the cylinder to be driven rotationally, and a toothed belt driven by a motor and abutting the periphery of the cylinder to drive the cylinder.

3. The machine according to claim 1, further comprising:

centering means for positioning each stick in a vertical position, said centering means comprising at least one funnel and inserting means for inserting each stick into the chuck, said inserting means comprising two rollers with parallel axes, at least one of which is grooved and at least one is motorized.

4. The machine according to claim 3, wherein the chuck has a pulley pivotally mounted on a fixed support and driven rotationally at its periphery, said pulley being equipped, on a side opposite the support, with two pins oriented parallel to its axis, each pin being engaged in a recess in one jaw of the chuck, the jaws delimiting a central opening for holding a stick, and being kept pressed against each other by at least one elastic element surrounding said chuck.

5. The machine according to claim 1, wherein the basin containing the sugar sprayhead, inside which cotton candy is formed onto a stick, is driven rotationally, is comprised of a crown on which a lateral wall is movably mounted, and is delimited by an upper panel traversed by the chuck that holds a stick when the cotton candy is formed.

6. The machine according to claim 5, further comprising a cotton-candy receiving area below the basin and accessible through a door, the receiving area including two rollers with horizontal, parallel axes, one roller having a roll of synthetic food-quality film for winding onto the other roller, which is the takeup roller, driven sequentially, an area between the rollers forming a holding area for the cotton candy before it is discharged.

7. The machine according to claim 1, further comprising:

a valve;

a slanting tube attached to the valve;

a vertical tube communicating with the slanting tube, and having a lower end;

a plug at the lower end of the vertical tube;

a rod passing axially through the vertical tube;

a spring;

a solenoid;

a plunger; and a sugar storage bin whose with a lower end having an opening that communicates through the valve with the slanting tube that itself communicates with the vertical tube which, terminating above the sugar sprayhead to supply the latter with sugar, is equipped at its lower end with the plug in the shape of a poppet valve, integral with the rod passing axially through tube, the other end of said rod being urged by the spring acting in the valve closing direction, the solenoid when energized, driving the plunger which compresses the spring and releases the rod and the plug.

8. The machine according to claim 6, wherein the frame includes an opening for access to the cotton-candy receiving area, closable by a door comprised of a cylindrical-surface section with a horizontal axis, whose two ends are integral with two end panels shaped like circular disks with the same axis as the cylindrical-surface section, which are articulated on two lateral walls of the frame around this axis, such that, in a first position, the cylindrical-surface section, located outside the machine, blocks the opening and, in a second position, the cylindrical-surface section is tipped inside the machine, uncovers the opening, and allows access to the cotton-candy receiving area.

9. An automatic cotton candy making machine, comprising:

a frame;

a stick hopper attached to the frame, the stick hopper dispensing sticks one by one;

a basin attached to the frame;

a chuck rotatably attached to the frame, the chuck comprising jaws for holding a stick in a first position in which the stick protrudes into the basin;

a stick transfer device attached to the frame and for transferring the stick from the stick hopper to the chuck, the stick transfer device comprising a substantially horizontal trough disposed in the cylinder, one end of said trough extending beyond the cylinder, said trough also containing an endless motorized belt having an end outside the cylinder that terminates in a device for changing the position of each stick from horizontal to vertical; and a sugar sprayhead located in the basin, wherein the stick hopper comprises a cylinder with an internal face, the cylinder having a substantially horizontal axis and rotating about the axis, at least one lengthwise bar on the internal face of the cylinder and delimiting a cavity which faces in the direction of rotation of the cylinder, and a stick collecting device located below the upper most generatrix of the cylinder for collecting the stick picked up by the bar and releasing the bar under the effect of gravity as the cylinder rotates.

10. The machine according to claim 9, wherein the device for changing the position of each stick from horizontal to vertical is comprised of a second hopper having a stick infeed, the second hopper being delimited by two substantially vertical walls oriented in a stick-feed direction, a third wall opposite the stick-feed direction, slightly inclined to the vertical, and a fourth wall located near the stick infeed having successively, from top to bottom, a substantially horizontal plane, a plane inclined at approximately 45°, and a plane slightly inclined relative to the vertical.

* * * * *